US007725712B2

(12) United States Patent
Ginzburg et al.

(10) Patent No.: US 7,725,712 B2
(45) Date of Patent: *May 25, 2010

(54) USER AUTHENTICATION SYSTEM AND METHOD

(75) Inventors: Lev Ginzburg, Rockaway, NJ (US); Paul Sitar, Monroe, CT (US); George Kelly Flanagin, Richmond, VA (US)

(73) Assignee: SyferLock Technology Corporation, Southport, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/552,555

(22) Filed: Oct. 25, 2006
(Under 37 CFR 1.47)

(65) Prior Publication Data

US 2007/0162745 A1 Jul. 12, 2007

Related U.S. Application Data

(63) Continuation-in-part of application No. 10/964,408, filed on Oct. 13, 2004, now Pat. No. 7,143,440.

(60) Provisional application No. 60/510,971, filed on Oct. 14, 2003, provisional application No. 60/541,160, filed on Feb. 2, 2004, provisional application No. 60/544,400, filed on Feb. 13, 2004.

(51) Int. Cl.
*H04L 9/00* (2006.01)
(52) U.S. Cl. ........................................ 713/159; 713/185
(58) Field of Classification Search .................. 380/44, 380/278; 726/18; 713/168, 159, 185
See application file for complete search history.

(56) References Cited

U.S. PATENT DOCUMENTS

| 4,184,148 A | 1/1980 | Smagala-Romanoff ..... 340/149 |
| 4,198,619 A | 4/1980 | Atalla ......................... 340/149 |
| 4,471,216 A | 9/1984 | Herve .......................... 235/380 |

(Continued)

FOREIGN PATENT DOCUMENTS

WO WO 2005038573 A2 * 4/2005

OTHER PUBLICATIONS

Lea Purcell, Completing the Client Puzzle, 1994, Bank Systems & Technology, pp. 35-36.

(Continued)

*Primary Examiner*—Eleni A Shiferaw
(74) *Attorney, Agent, or Firm*—Perman & Green, LLP

(57) ABSTRACT

A method of authenticating a user for access includes creating an authentication key in the form of a user formula selected from a set of variables and operations provided by the authentication system, storing the user formula in the authentication system, utilizing a display to present the user with an arrangement of variables generated by the authentication system including the variables of the user formula, each assigned a value, applying the assigned values to matching variables in the user formula and calculating a first result, interspersing one or more additional characters among the characters of the first result, and conveying the first result with the additional characters to the authentication system. The authentication system authenticates the user if the number of additional characters conveyed with the first result is below a predetermined threshold and the first result matches a second result of a separate and independent calculation of the user formula by the authentication system.

39 Claims, 11 Drawing Sheets

U.S. PATENT DOCUMENTS

| | | | | |
|---|---|---|---|---|
| 4,528,442 | A | 7/1985 | Endo | 235/379 |
| 4,779,224 | A | 10/1988 | Moseley et al. | 364/900 |
| 4,964,163 | A | 10/1990 | Berry | 380/23 |
| 5,130,519 | A | 7/1992 | Bush et al. | 235/380 |
| 5,163,097 | A | 11/1992 | Pegg | 380/21 |
| 5,239,583 | A | 8/1993 | Parrillo | 380/23 |
| 5,251,259 | A | 10/1993 | Mosley | 380/23 |
| 5,265,162 | A | 11/1993 | Bush et al. | 380/24 |
| 5,428,349 | A | 6/1995 | Baker | 340/825 |
| 5,519,646 | A * | 5/1996 | Uemura et al. | 708/142 |
| 5,682,475 | A | 10/1997 | Johnson et al. | 395/188.01 |
| 5,754,652 | A | 5/1998 | Wilfong | 380/24 |
| 5,819,102 | A | 10/1998 | Reed et al. | 395/800.34 |
| 5,971,272 | A | 10/1999 | Hsiao | 235/380 |
| 6,047,066 | A | 4/2000 | Brown et al. | 380/2 |
| 6,118,872 | A | 9/2000 | Kashima et al. | 380/205 |
| 6,154,841 | A | 11/2000 | Oishi | 713/180 |
| 6,246,769 | B1 | 6/2001 | Kohut | 380/45 |
| 6,253,328 | B1 | 6/2001 | Smith, Jr. | 713/202 |
| 6,286,017 | B1 * | 9/2001 | Egilsson | 715/207 |
| 6,571,336 | B1 | 5/2003 | Smith, Jr. | 713/184 |
| 6,587,853 | B1 | 7/2003 | LaRue | 707/9 |
| 6,750,864 | B1 * | 6/2004 | Anwar | 345/440 |
| 6,833,847 | B1 | 12/2004 | Boegner et al. | 345/705 |
| 6,944,663 | B2 | 9/2005 | Schuba et al. | 709/225 |
| 7,043,635 | B1 | 5/2006 | Keech | 713/168 |
| 7,073,067 | B2 * | 7/2006 | Mizrah | 713/183 |
| 7,178,098 | B2 * | 2/2007 | Bauchot et al. | 715/212 |
| 2003/0056181 | A1 * | 3/2003 | Marathe | 715/538 |
| 2003/0172159 | A1 * | 9/2003 | Schuba et al. | 709/225 |
| 2004/0073802 | A1 | 4/2004 | Seol | 713/183 |
| 2006/0069635 | A1 * | 3/2006 | Ram et al. | 705/37 |

OTHER PUBLICATIONS

Wang et al, Defending Against Denial-of-Service Attacks with Puzzle Auctions, 2003, IEEE, pp. 78-92.

Bowen et al, Next Generation SCADA Security: Best Practices and Client Puzzles, 2005, IEEE, pp. 426-427.

Mahinkar et al, Game-Based Analysis of Denial-of-Service Prevention Protocols, 2005, IEEE, pp. 287-301.

Feng et al, The Design and Implementation of Network Puzzles, 2005, IEEE, pp. 2372-2382.

Miao Ma, Mitigating Denial of Service Attacks with Password Puzzles, 2005, IEEE, pp. 621-626.

Fung, et al, A Denial-of-Service Resistant Public Key Authentication and Key Establishment Protocol, 2002, IEEE, pp. 171-178.

McNevin et al, Chained Puzzles: A Novel Framework for IP-Layer Client Puzzles, 2005, IEEE, pp. 298-303.

* cited by examiner

FIGURE 9

USER AUTHENTICATION SYSTEM AND METHOD

This application is a continuation in part of U.S. application Ser. No. 10/964,408, filed on 13 Oct. 2004 now U.S. Pat. No. 7,143,440, which claims the benefit of U.S. Provisional Application No. 60/510,971, filed Oct. 14, 2003, U.S. Provisional Application No. 60/541,160, filed Feb. 2, 2004, and U.S. Provisional Application No. 60/544,400, filed Feb. 13, 2004.

BACKGROUND

The presently disclosed embodiments relate to data security and, in particular, to user authentication.

BRIEF DESCRIPTION OF RELATED DEVELOPMENTS

A computer system may provide various applications or services for users. In general, access to the system may be limited to authorized users. One example of user authentication is a login process where a user is required to enter a user name and a password.

In spite of new developments in technology, the combination of the user name and password remains one of the most common access control devices. However, passwords may be disadvantageous because those that are easily remembered are the easiest to determine and those that are complicated and hard to determine are easily forgotten.

The integrity of these types of systems is generally based on keeping the password secret. However, there are many known ways of determining a password, including guessing, applying a dictionary of common passwords or even all known words, brute force attempts including applying all combinations of characters, monitoring network traffic for passwords during exchanges with the server, "shoulder surfing" (looking over a user's shoulder during login), key logging (storing or conveying a user's keystrokes during login), etc.

Known defensive measures against these types of attacks include making passwords longer to make them more difficult to guess, and making dictionary application and brute force techniques more difficult. Other defensive measures include prohibiting the use of "meaningful" passwords such as user-related names, phone numbers, dates of birth, etc., displaying a non-meaningful character such as an asterisk when a user enters a password, the shoulder surfer can see only asterisks, encrypting passwords before sending them over a network to prevent detection by network monitoring.

One method of access control and authentication is the use of one time passwords (OTP), where a user uses a different password each time they log in, thus rendering many of the above-mentioned attack techniques useless. To intercept, keylog, or otherwise determine a password offers no advantage because the password obtained can't be reused.

Most generally available OTP systems share more or less the same protocol. As part of the login process, the server sends the user a so called challenge, which may simply be a large random number. The user enters this number into an OTP generator, for example, a special physical device or software that generates an OTP. The user enters the OTP. The server also enters the challenge into its own OTP generator. If the server OTP and the user OTP match, the user is authenticated.

Where the OTP generator is a physical device (e.g., smart card, token, biometric device, etc.), the cost and inconvenience of a lost, broken, or stolen OTP generator may be of concern.

In instances where the password-producing algorithm is the same for all users, each user is assigned a secret key in order to make the outcome unique. This key is generally embedded in the user's OTP generator and is also stored in the server's database. There are several variations of this OTP generation scheme, for example, the time of day may be used to synchronize a user and server instead of a challenge. In most cases, security relies upon the integrity of the user's secret key. If the key is compromised, the system becomes ineffective. As a result, like a password, the key becomes the subject of various types of attack, with brute force being one of the most popular. An additional layer of security is provided by protecting the algorithms that calculate the OTP, however, with some persistence, the algorithms may be determined and are not a reliable security element.

In a networked environment, a server generally provides various services and applications to a multitude of networked users. The server operates to verify a user in order to properly authorize the use of a particular service or application. This is typically accomplished by the standard login process described above, where the server matches a presently entered user name and password with a stored user name and password.

It would be advantageous to provide an authentication system that is robust and resistant to dictionary applications, brute force attempts, traffic monitoring, shoulder surfing, key logging, and various other type of attacks.

SUMMARY

In one embodiment, a method of authenticating a user for access to a device, service, application, function, or system, includes creating an authentication key in the form of a user formula selected from a set of variables and operations provided by the authentication system, storing the user formula in the authentication system, and utilizing a display to present the user with an arrangement of variables generated by the authentication system, including the variables of the user formula, each assigned a value. The method also includes applying the assigned values to matching variables in the user formula and calculating a first result, interspersing one or more additional characters among the characters of the first result, and conveying the first result with the additional characters to the authentication system, wherein the authentication system authenticates the user if the number of additional characters conveyed with the first result is below a predetermined threshold and the first result matches a second result of a separate and independent calculation of the user formula calculated by the authentication system.

In another embodiment, a method of authenticating a user for access to a device, service, application, function, or system, includes creating an authentication key in the form of a user formula having variables and operations provided by the authentication system, storing the user formula in the authentication system, and utilizing a display to present the user with an arrangement of variables and values including variables in the user formula and values in target locations of the arrangement associated with each variable. The method also includes applying the values at the target locations associated with the variables in the arrangement to matching variables in the user formula and calculating a first result, conveying the first result to the authentication system, wherein the authentication system authenticates the user if the first result matches a second result of a separate and independent calculation of the user formula calculated by the authentication system.

In still another embodiment, a method of authenticating a user for access to a device, service, application, function, or system, includes creating an authentication key in the form of a user formula having variables and operations provided by the authentication system, storing the user formula in the authentication system, and utilizing a display to present the user with an arrangement of variables and values including variables in the user formula and values in target locations of the arrangement associated with each variable. The method also includes applying the values at the target locations associated with the variables in the arrangement to matching variables in the user formula and calculating a first result, interspersing one or more additional characters among the characters of the first result, and conveying the first result with the additional characters to the authentication system, wherein the authentication system authenticates the user if the number of additional characters conveyed with the first result is below a predetermined threshold and the first result matches a second result of a separate and independent calculation of the user formula calculated by the authentication system.

BRIEF DESCRIPTION OF THE DRAWINGS

The foregoing aspects and other features of the embodiments are explained in the following description, taken in connection with the accompanying drawings, wherein:

FIG. 9 shows another example of a user interface screen for use with the user authentication system;

DETAILED DESCRIPTION OF THE PREFERRED EMBODIMENT(S)

Figure 1:
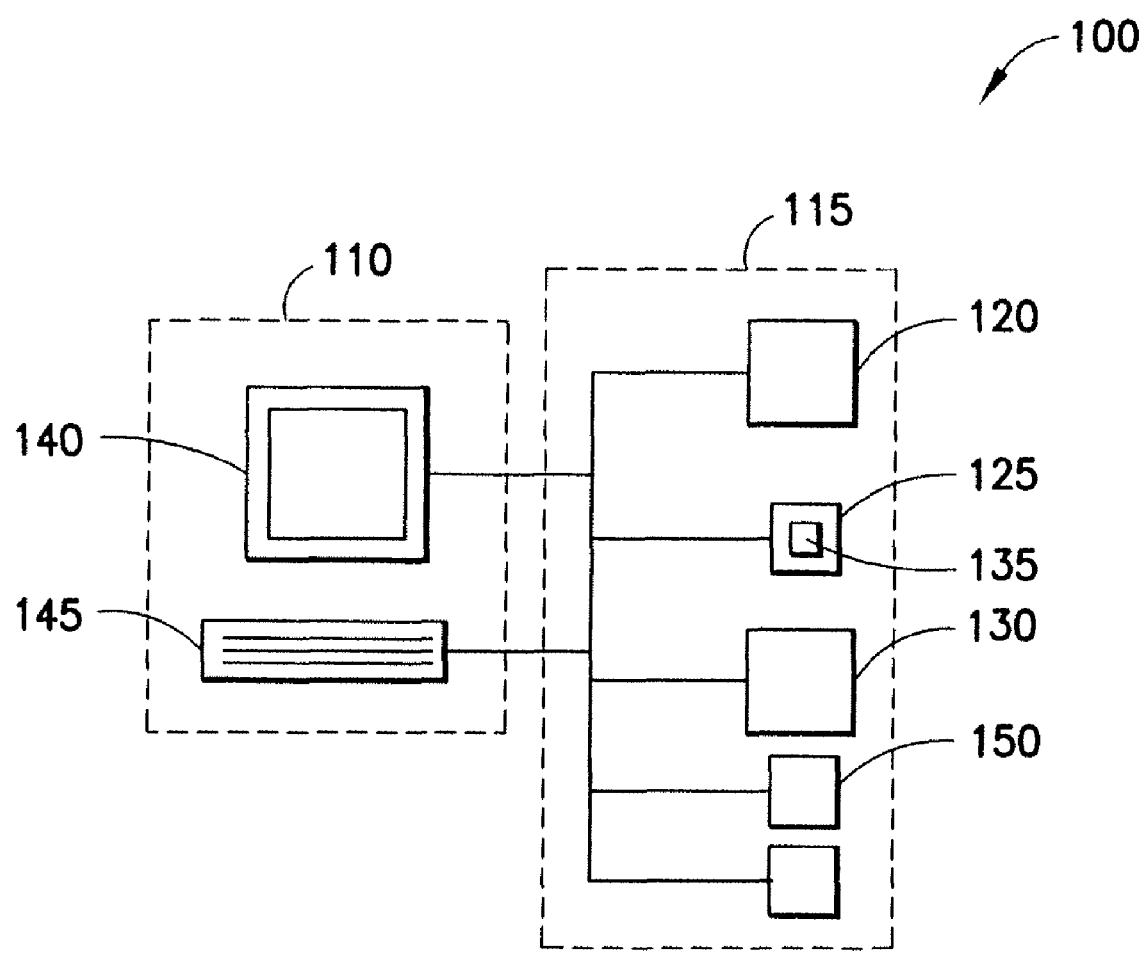
FIG. 1 shows one example of a user authentication system according to the disclosed embodiments.

FIG. 1 illustrates a user authentication system 100 incorporating features of the disclosed embodiments. Although the embodiments are described with reference to the drawings, it should be understood that they may include many alternate forms and any suitable size, shape or type of elements or materials.

As shown in FIG. 1, the system 100 generally includes a user interface function, shown in this example by user interface 110 and an authentication control function, shown in this example as controller 115.

The disclosed embodiments include creating an authentication key in the form of a user formula. Upon initiation of an authentication session, a user is presented with an arrangement of variables, each assigned a value. The user applies the values associated with the presented variables to matching variables in the user formula and enters the result.

Figure 2:
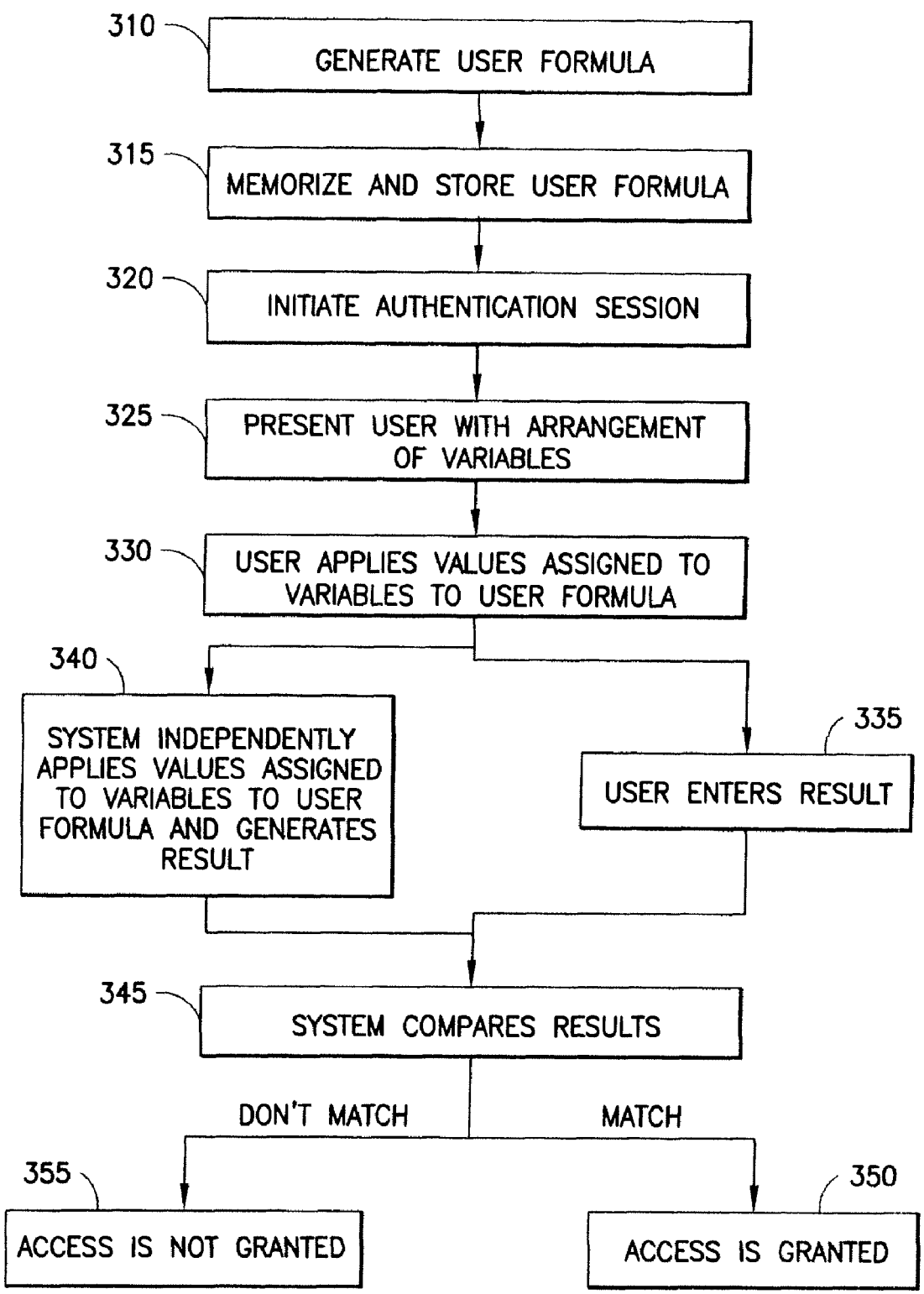
FIG. 2 shows a flow chart of the operations associated with the authentication system.

Explained in more detail with reference to the flow chart of FIG. 2, a user formula is generated as shown in block 310. The user formula may be constructed by a user from a set of variables and operations. The authentication system 100 may provide an application to assist the user by providing lists of variables and operations from which to choose. The authentication system 100 may also provide an application that may generate a user formula automatically for a user. The resulting formula is generally memorized by the user and stored by the authentication system as shown in block 315.

The user requests access to a device, service, application, or function, and an authentication session may then be initiated as shown in block 320. Upon initiation of an authentication session, the authentication system presents a user with an arrangement of variables as shown in block 325, each assigned a value. The user recognizes the variables presented in the arrangement that match the variables in the user formula. The user then applies the values assigned to the variables to the user formula as shown in block 330 and enters the result as shown in block 335.

The values may be randomly generated and assigned to the variables and may generally change with each authentication session. The authentication system independently applies the values assigned to the variables to the user formula and generates an independent result as shown in block 340. The authentication system compares the independent result with the entered result as shown in block 345 and if the results match, the authentication system gives the user access to the service or application (block 350). If the results do not match, access is denied (block 355).

As an example, a user might construct the following user formula: $3*(2*Q+3*T)$. During an authentication session, an arrangement of variables and values is presented to the user. If the variable Q in the arrangement is assigned the value 32, and the variable T in the arrangement is assigned the value 9, the user formula yields $3*(2*32+3*9)$, or the number 273. The user then enters the number 273. Because the authentication system generated the arrangement of variables and values, and has stored the user formula, the authentication system uses the user formula to make the same calculations. If the results match, the user is authenticated.

In addition to the authentication session described above, system 100 may provide an administration process as part of the authentication system. The authentication session includes qualifying a user for access to a device, service, application, or function as described above. The administration process generally provides a user with tools that allow a user to set up a formula, records the formula for subsequent authentication sessions, and handles other set up and administrative processes such as allocation of space and directories, encryption processes, communication between programs, etc.

Figure 3:
FIG. 3 shows an example of a user interface screen for use with the user authentication system.

As mentioned above, as part of the authentication session, an arrangement of variables may be presented to a user. An example arrangement is shown in FIG. 3. In this example, arrangement 360 includes a grid 365, an area for entering a user name 370, and an area for entering a password 375 that, in accordance with the disclosed embodiments, is the result of applying the user formula. The grid 365 is made up of cells 380, where each cell may be denoted by a letter or letter combination 385 representing a user formula variable. Each variable is assigned a value 390. As mentioned above, the values assigned to each variable may change each time the arrangement is presented to a user. In one embodiment, each value is produced by a random number generator each time the arrangement is presented.

Using the exemplary formula 3*(2*Q+3*T) mentioned above, a user would examine arrangement 360 and recognize that variable Q is assigned a value of 69 and variable T is assigned a variable of 49. The user would apply the formula and enter the result.

In this example, each cell includes two components, a variable and a value. While the variable is described in the context of letters and the value is described in the context of numbers, it should be understood that the variables and values may be shown as any recognizable mark, symbol, or image.

Also in this example, the arrangement of variables is shown as a 10 by 10 cell grid. However, the arrangement may have any shape and may include any number of cells or locations.

The user formula may include any mathematical and non-mathematical operator, for example, add, subtract, multiply, divide, power, max, min, mod, concatenate, etc., and may also include parenthesis to alter the sequence of operations. The authentication system may also provide custom operators that allow a user to perform any function on the variables of the formula that may be desirable.

Figure 4:
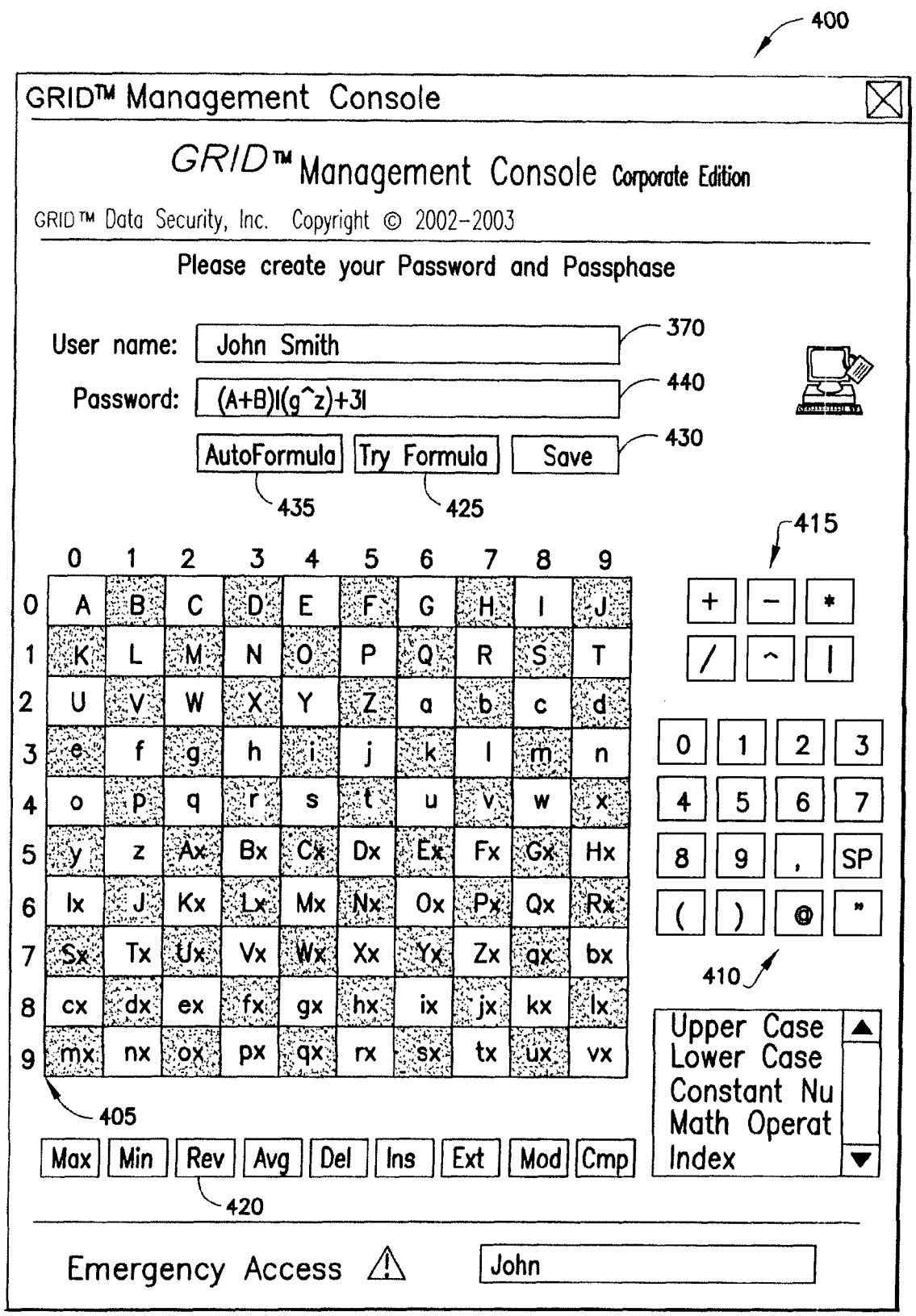
FIG. 4 shows an example of an administration screen for use with the user authentication system.

FIG. 4 shows an example of an administration screen 400 that may be presented to a user as part of the administrative process. The administrative process may provide a user with various tools, for example a "wizard" that may walk a user through each step of a user set up process, and a formula builder to assist a user in setting up a formula. In one embodiment, the formula builder could provide a user with menus of variables and operators to choose from and assist the user with compiling a formula unique to that user.

Administration screen 400 may include an arrangement of variables 405, a numerical keypad 410, keys for mathematical 415 and non mathematical functions 420, and keys for testing 425 and saving 430 a formula. Administration screen 400 may also include areas for entering a user name 370 and a user formula 440. A user may enter a user formula by selecting among the variables and various operators.

For example, a user may type a user formula using keyboard 145 (FIG. 1). As the user types the formula it may be displayed in user formula area 440. Alternately, a user may use a pointing device to position a cursor over a character, variable, or operator and click a mouse button or press an enter key to select the desired character, variable, or operator. The selections are displayed in user formula area 440. The user continues until the user formula has been constructed as desired. When the user formula is complete, the user may then activate the "save" button 430 to store and use the formula.

In one embodiment, a user may be provided with a facility to construct one or more custom operators. For example, one of the operators may include an offset function, where the function is associated with a variable in the user formula and applies the value from a variable in the arrangement that is offset from the associated variable. The offset function may be expressed as (Offset (x, y)) where x refers to an x axis offset and y refers to a y-axis offset. An exemplary user formula that includes the offset function may be A+B(Offset (1, 1)). Referring to FIG. 3, a user would first find and use the value assigned to variable A, and would then find variable B, but would use the value from variable M which is offset by the coordinates (1, 1) in this authentication session.

A user may use any offset desired so long as the offset points to a variable present within arrangement 365. In one exemplary implementation a user enters the offset function by simply typing "(Offset (x, y)" where desired in the user formula. In another exemplary implementation, one of the non mathematical functions 420 may include a button labeled "Offset." Pressing the Offset button may initiate a dialog box that requests a user to enter the offset coordinates. Upon entering the coordinates, an offset designation, for example, (Offset (1, 1) may appear in the user formula displayed in the user formula area 440.

In another derivation of the offset function, a special offset may be determined, referred to as an IX function. The IX function utilizes the value associated with a variable as coordinates that point to the upper left hand portion of the arrangement. For example, a user may wish to use a user formula 2*B and may wish to designate variable K as specifying the upper left hand corner of the arrangement 365. After pressing the Offset button, in response to the request for coordinates, the user may respond with IX(K) or some other appropriate designation for the special offset and the designation.

Subsequently, when the user is using the arrangement 365 to determine the result of the user formula, the user would observe that variable K is assigned the value "43" and then would consider the coordinates (4, 3) as the offset location for variable A, the coordinates (5, 3) as designating the offset location for variable B, the coordinates (6, 3) as designating the offset location for variable C, etc. Using the value at coordinates (5, 3), the user formula 2*B yields "104" which would then be entered in the password area 375.

Other custom operators may be created that perform any function, operation, or combination of functions or operations.

As another example, administration screen 400 may include a selection for creating a custom function that operates on one or more variables. The custom function could include any number of mathematical, logic (AND, OR, XOR, etc.) trigonometric, statistical, etc. types of operations. A user may be presented with one or more scripts that may be used as templates for designing custom functions. Scripts may also be provided for presenting buttons or menu items to users for invoking the custom functions and for using the custom functions in user formulas.

The ability to create custom functions is advantageous because it allows a system to be customized for a particular user or a portion of an enterprise. A purchaser of the system is provided with the ability to further enhance the security of the system by creating custom functions and operators not available or known to other system purchasers.

The authentication system may offer a greater measure of security by providing a function that creates a formula within a formula, referred to as an AutoToken™ function. A user invokes the AutoToken™ function, for example, by selecting an AutoToken™ key 435 (FIG. 4). The AutoToken™ function prompts the user for a user formula which the user enters in the user formula area 440.

The AutoToken™ function automatically creates two formulas, referred to as a local formula, and a remote formula, respectively. Each of the local and remote formulas includes variables, constants and operations that may be randomly selected and randomly ordered so long as they form an operational formula. The variables, constants and operations may include variables from the arrangement of variables that is presented to a user and operations provided by the administration process. The local and remote formulas may be of any complexity and length and are generally the same except that the local formula includes a result variable for receiving the result of the user formula that will be input by a user, while the remote user formula includes the user formula itself.

The remote formula may be stored at any location designated by the authentication system and the local formula may be stored in a location local to the user. In one embodiment, the local formula may be stored at any location designated or selected by the user.

The local formula may be transportable for use in accessing a device, service, application, or function, from a different location. For example, the local formula may be stored so that it is portable, which includes storing the local formula on any type of transportable media, for example, magnetic, optical, semiconductor, or other suitable media. The local formula may be stored on, for example, a floppy disk, compact disk, flash memory card, USB drive, or any suitable device for storing and accessing the local formula (e.g. 247 in FIG. 5, described below).

In one embodiment, the local formula may not necessarily be stored but may be transported or transmitted to another location for use by the user.

An authentication session for a user who has implemented an AutoToken™ function proceeds as follows. The user requests access to a device, service, application, or function, and an authentication session is initiated. The system presents the user with an arrangement of variables and the user enters the result of his user formula. If the local formula has been stored on transportable media, at this time or at any time prior to this point, the transportable media is coupled to the system so that the local formula is accessible by the authentication system. The authentication system inserts the result in place of the result variable in the local formula, inserts values from the arrangement of variables into the rest of the local formula, and computes the result of the local formula. The authentication system also inserts values from the arrangement of variables into the user formula in the remote formula, as well as the rest of the remote formula, and computes the result of the remote formula.

The authentication system compares the results, and if they match the user is granted access to the device, service, application, or function desired.

If for some reason a user's user formula is compromised, the user may invoke the AutoToken™ function again to create new local, remote, and user formulas without requiring additional support resources, thus securing the continuation of secure access.

As another feature, the authentication system generally allows a user to embed functions within other functions to extend the security of a user formula. For example, a user formula could include A+(AVE(AVE B+C+(AVE D+E+F))+G+H). A special function may be used to embed dummy characters within a user formula based on a value assigned to a variable from the arrangement 365. This function could be designated as a "Set" function. An exemplary user formula using the Set function may be:

(set Z,1)[user formula].

In an arrangement where the variable Z is assigned the value 5, a user would type in five dummy characters before entering the first value of the result of the user formula. Thus, any number of dummy characters may be inserted at any location within the result of a user formula.

As an additional security feature, a user formula could use values assigned to variables of the arrangement 365 to designate specific letters within specific words of a secret phrase. For example, a user may determine that their secret phrase may be "the dog is lazy," and may decide on a user formula of ABCD. When constructing their user formula, the user could type commands designating their secret phrase and their user formula into user formula area 440.

Alternately, the non mathematical functions 420 may include functions that allow a user to select the designations. During authentication, an arrangement may be presented, for example, where A is assigned the value 31, B is assigned the value 14, C is assigned the value 21, and D is assigned the value 13. Applying the values of the arrangement to the phrase for A=31 would yield the third letter of the first word, B=14 yields the first letter of the fourth word, C=21 yields the second letter of the first word, and D=13 yields the first letter of the third word. Thus, the user would type in ELHI. Given the arrangement and the secret nature of the phrase, an attempt at deciphering such a result would most likely result in failure.

The authentication system may offer a greater measure of security by providing a reset function within a user formula. This reset function operates to reset the variable arrangement presented to the user. For example, as part of an authentication session, an arrangement of variables as shown in FIG. 3 is presented to the user. The user examines the arrangement, recognizes the value of the first variable of the user's formula and enters the first variable. After entering the first variable, the reset function is activated, for example, by a command in the user formula or by typing a command, and the values and variables are changed such that the user is presented with a new arrangement. The user continues to utilize the user formula, recognizing the value of the next variable in the formula from the new arrangement. When the user has recognized all the values, computed and entered the result of the user formula, the user is granted access as desired.

An example of a user formula using the reset function may be:

A∥B∥<reset>C where the value associated with variable A is concatenated with the value associated with B, the variable arrangement is reset and the concatenation of A and B is concatenated with the new value of variable C.

It should be understood that the reset function may be inserted anywhere in the user formula and may be inserted in one or more places in the user formula. The reset function may be activated by various methods, for example, as a response to pressing a particular key, or automatically after a value has been entered.

Referring to the administration screen in FIG. 4, the reset function may be presented to a user as part of a formula builder, or "wizard" that provides a user with a step by step process for inserting the reset function.

As mentioned above, the reset function operates to reset the variable arrangement presented to a user. This may take the form of regenerating new values for the variables in the arrangement, changing the location of the variables or a combination of both. The reset function may generate the new arrangement using a formula that is based on a seed number or variable provided by a user during the formula builder or wizard process. The variable seed may be a variable from the variable arrangement present to the user.

Thus, the reset function provides a heightened level of security to the presently disclosed embodiments. For example, in a networked environment, if communication between a desktop computer and a server is intercepted, data about the variable arrangement may be extracted. For example, one might attempt (albeit unsuccessfully) to derive the variable arrangement from the intercepted data. The reset function operates to reset the variable arrangement locally, without external communication. Thus, efforts to derive the variable arrangement by intercepting communications are rendered useless because a new variable arrangement is generated and there is no communication associated with the reset or the new variable arrangement.

Referring again to FIG. 1, system 100 may be a desktop computer that includes user interface 110 and controller 115. Controller 115 may include one or more processors 120 for executing an authentication program 135 from a memory 125 and may also include a storage device 130 for storing information, data, and programs. Controller 115 may also include an interface for communicating with other devices. User interface 110 may include a display device 140 for presenting information to a user and one or more input devices 145, for example, a keyboard and a pointing device, for inputting information, queries, responses, and commands.

Processor 120 may provide authentication services under control of authentication program 135, and upon authentication, may allow an authenticated user to access or utilize service 150. In this embodiment, service 150 may be a local service, that is, may reside within desktop computer 100. Service 150 may be any device, service, application, or function to which processor 120 or a user of system 100 may require access. For example, service 150 may be a data processing system, a computational service, a content delivery service, a data base, a file system, etc.

In the course of operations a user may attempt to access service 150 through controller 115. Controller 115 initiates an authentication session as described above to determine if the user is eligible, has permission, or is generally allowed to access service 150. If the user provides the proper credentials, that is, the proper application of assigned values to the user formula as described herein, controller 115 allows access to service 150.

Figure 5:
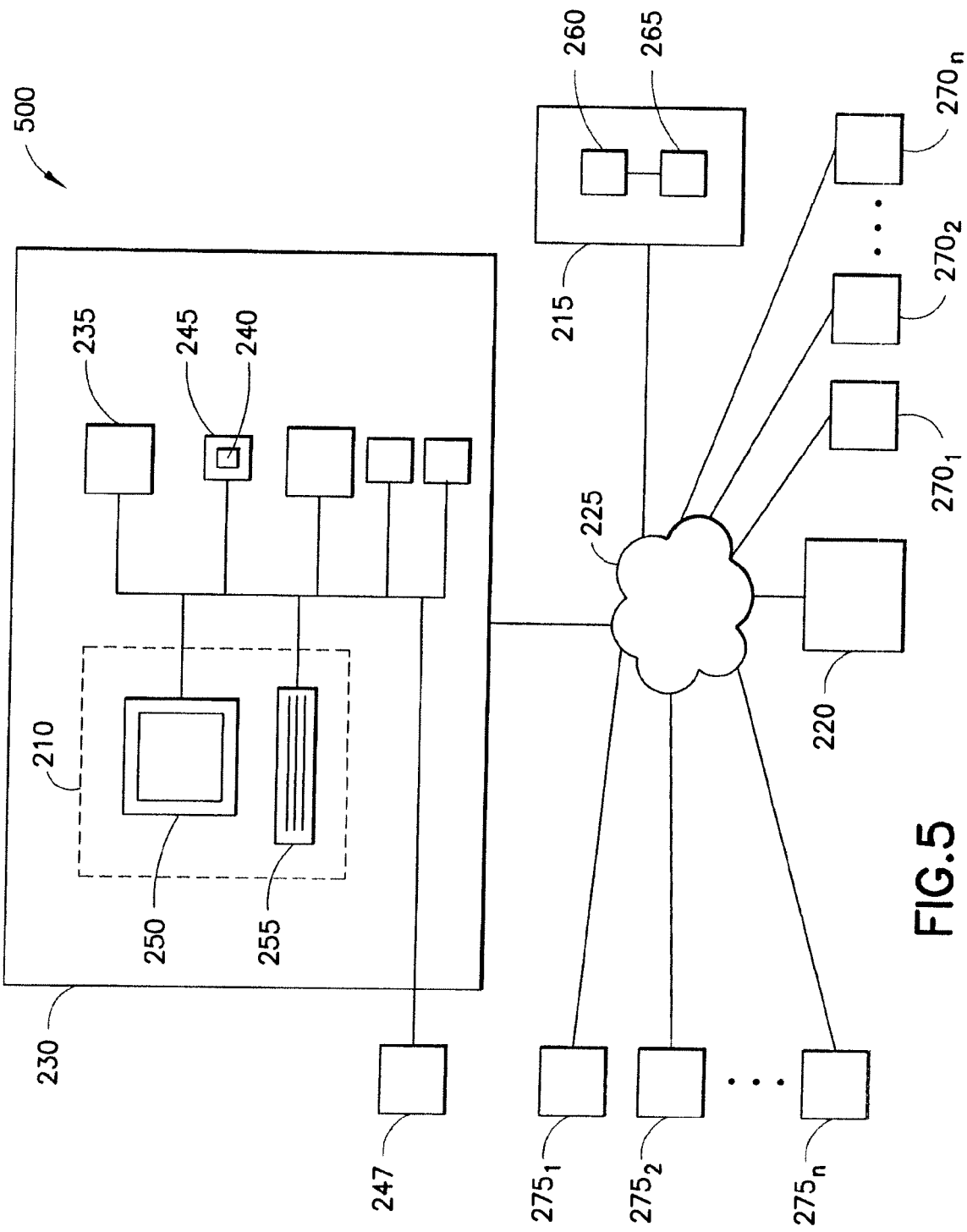
FIG. 5 shows the present embodiments as utilized in an enterprise network.

FIG. 5 illustrates another embodiment shown as a distributed system 500. System 500 may be part of an enterprise or corporate wide area network or local area network and generally includes a user interface 210, a controller 215, and an application or service 220 connected by a communications network 225. User interface 210 may generally be part of a local computing device 230 and controller 215 and service 220 are generally remote from computing device 230. Local computing device 230 may include one or more processors 235 for executing programs 240 stored on a storage device 245. Computing device 230 may also include an external, removable storage device 247 for storing a local formula. User interface 210 may include a display device 250 for presenting information to a user and one or more input devices 255, for example, a keyboard and a pointing device, for inputting information, queries, responses, and commands.

Controller 215 may operate as an authentication server and may include one or more processors 260 and a storage facility 265 for storing programs that control the authentication processes and sessions. As an authentication server, controller 215 may operate to authenticate computing device 230 or a user of computing device 230. Upon authentication, controller 215 operates to provide service 220 to computing device 230 or to allow computing device 230 to access service 220. Controller 215 also operates to direct traffic among components of system 200 under the control of instructions or programs stored in storage facility 265. Controller 215 may also provide storage capacity for computing device 230 within storage facility 265. As an authentication server, controller 215 may operate to authenticate other computing devices $275_1 \ldots 275_n$ and, upon authentication, provide other computing devices $275_1 \ldots 275_n$ with access to service 220 and to other services $270_1 \ldots 270_n$.

In this embodiment, programs that control the authentication processes and sessions may be distributed among storage device 245 and storage facility 265. Portions of the authentication processes and sessions may be performed by processors 235 and 260 under control of programs stored in storage device 245 and storage facility 265, respectively.

Service 220 may be any application or service to which computing device 230 or a user of computing device 230 may require access. For example, service 220 may be a data processing system, a computational service, a content delivery service, a data base, a file system, etc. Service 220 may reside within computing device 230, controller 215, or may reside anywhere within system 200 or in combination with any component of system 200.

Communications network 225 may include any link or network suitable for communication, for example, the Internet, the Public Switched Telephone Network (PSTN), a wireless network, a wired network, a virtual private network (VPN) etc. Communication may be executed using any suitable protocol, including X.25, ATM, TCP/IP, etc.

In the course of operations a user may attempt to access service 220. Controller 215 monitors or is notified of the attempted access. For example, controller 215 may monitor and intercept all attempts to access service 220 under control of programs stored in storage facility 265. As another example, service 220 may automatically route all access attempts to controller 215 for processing. Any other suitable method of using controller 215 to control access to service 220 may also be implemented.

Controller 215 initiates an authentication session to determine if the user is eligible, has permission, or is generally allowed to access service 220. Controller 215 provides computing device 230 with data and commands to display an arrangement of variables on display 250 and prompt a user to provide the result of the user formula. The computing device conveys the result to controller 215. Controller 215 also computes a result using the user formula and values from the arrangement of variables. If the conveyed result and the result computed by controller 215 match, controller 215 allows access to service 220.

In this embodiment, when a user has implemented an AutoToken™ function as described above, the local formula may be stored on external, removable storage device 247. Operations on the local formula, including inserting the result of the user formula in place of the result variable in the local formula, inserting values from the arrangement of variables into the rest of the local formula, and computing the result of the local formula may be performed by a client program running on computing device 230. Operations on the remote formula, including inserting values from the arrangement of variables into the user formula in the remote formula, as well as the rest of the remote formula, and computing the result of the remote formula may be performed by a server program on controller 215.

Figure 6:
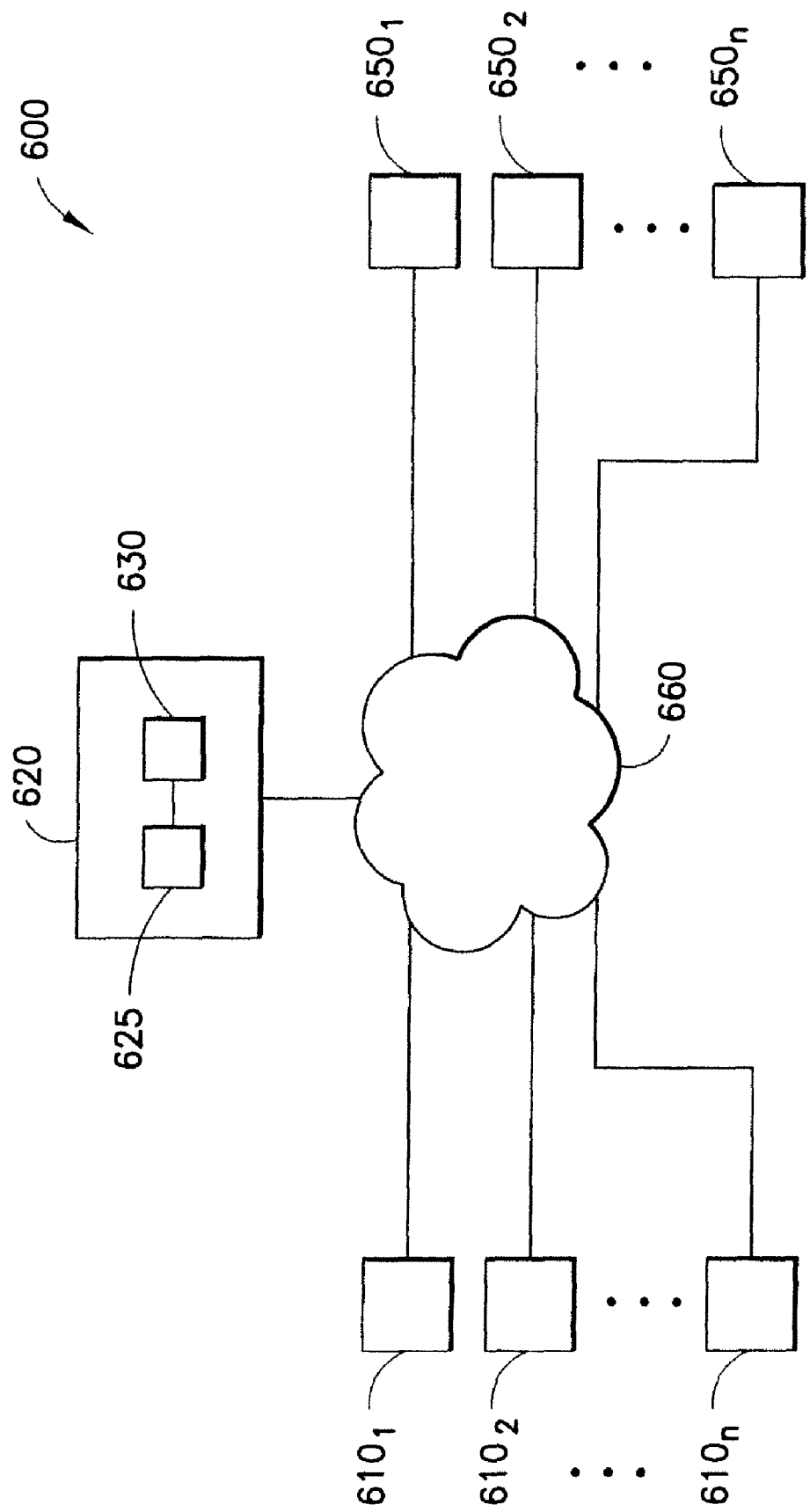
FIG. 6 illustrates another embodiment in a distributed system for electronic business transactions or e-commerce.

FIG. 6 illustrates another embodiment shown as a distributed system 600 for electronic business transactions or e-commerce. System 600 may be Internet based and may use the World Wide Web as a common communication medium. System 600 generally provides all the features of the previously described embodiments and includes a number of users $610_1 \ldots 610_n$, a controller 620, and a number of applications or services $650_1 \ldots 650_n$. Users $610_1 \ldots 610_n$, services $650_1 \ldots 650_n$, and controller 620 generally represent independent entities, for example, business entities, that are connected by the Internet 660. For example, users $610_1 \ldots 610_n$ may be individuals accessing the services or may be computing devices accessing the services under program control. In one embodiment, users $610_1 \ldots 610_n$ may pay a fee to access one or more of the services $650_1 \ldots 650_n$ and a controller 620 operates to control such access through authentication. The operators of services $650_1 \ldots 650_n$ in turn may pay a fee to a controller operator for the access and authentication services. Other business arrangements among the users, service operators and controller operator are also contemplated. Controller 620 may include one or more processors 425 for executing programs 630 that control user authentication and access to services $650_1 \ldots 650_n$. Controller 620 operates to authenticate users $610_1 \ldots 610_n$, and to provide one or more services $650_1 \ldots 650_n$ to an authenticated user. The services $650_1 \ldots 650_n$ may include any service to which users $610_1 \ldots 610_n$ may require access including e-commerce transactions. For example, services $650_1 \ldots 650_n$ may include merchandise purchasing systems, data processing systems, computational services, content delivery services for delivering text, audio or video, etc., all participating in commercial transactions over a network, such as the Internet.

In system 600, one or more users $610_1 \ldots 610_n$ may routinely access services $650_1 \ldots 650_n$. Controller 620 monitors or is notified of the attempted access. For example, controller 620 may monitor and intercept all attempts to access any of services $650_1 \ldots 650_n$. In another example, services $650_n \ldots 650_n$ may automatically route all access attempts to controller 620 for processing or otherwise notify controller 620 of an attempted access.

In response, controller 620 initiates an authentication session with each user 610 to determine if the particular user is eligible, has permission, or is generally allowed to access the one or more services $650_1 \ldots 650_n$. If the user 610 provides the proper credentials, that is, the proper result of the user formula as described herein, controller 620 allows access to the desired service or services.

In another embodiment, a user 610 may attempt to access one or more services $650_1 \ldots 650_n$ where access to the service is granted on a one-time basis. Controller 620 is notified or actively monitors the attempted access. In response, controller 620 initiates an authentication session with the user 610. An administrator, which may be a program or an operator, conveys a user formula to the user 610 that is only valid for a single use. The user 610 enters the result of the one time user formula and is generally allowed to access the one or more services $650_1 \ldots 650_n$.

Figure 7:
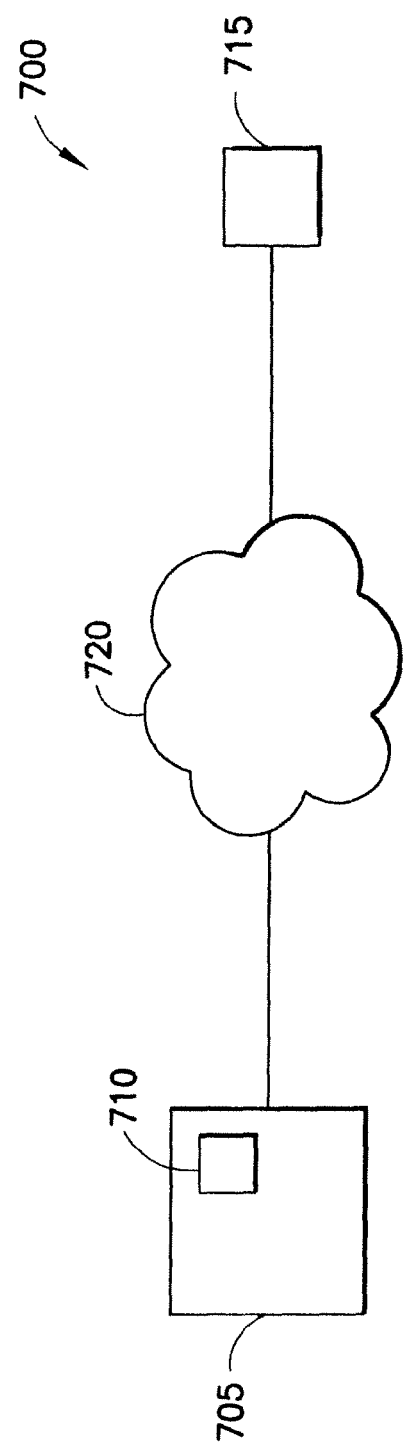
FIG. 7 shows an embodiment for securing data sent by a message.
Figure 8:
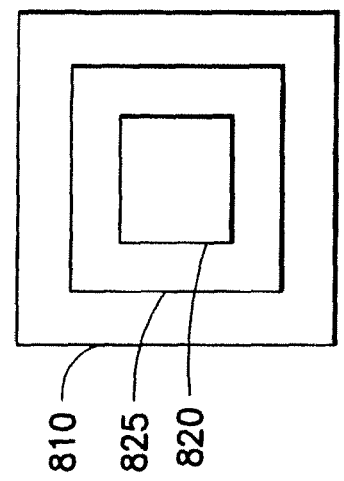
FIG. 8 shows a block diagram of an exemplary message.

FIG. 7 shows a system 700 that utilizes an embodiment for securing data sent as part of a message, for example, by email. The system 700 includes a message originator 705 that utilizes the authentication system 710 disclosed herein, a recipient 715 and a communications network. Both the originator 705 and recipient 715 include one or more processors, memory devices and programs to support message transfer and authentication operations as disclosed. The originator 705 constructs a message, for example an email, that includes data the originator 705 wishes to secure. A block diagram of such a message 810 is shown in FIG. 8. The data 820 may be included as part of the message or as a file attached to the message. The authentication system 710 includes a wrapper 825 with the message 810 and data 820 that will initiate an authentication session and prevent access to the data 820 unless the recipient 715 produces the proper credentials. The message is then conveyed to the recipient 715, for example, using a standard email protocol.

Upon receipt, the recipient 715 attempts to open the message. The wrapper initiates an authentication session, displaying an arrangement as shown in FIG. 3. A return receipt to the originator is also generated which causes the same authentication session to be initiated for the originator 705.

The originator 705 determines the result of the originator's user formula and then conveys the result to the recipient 715, generally through a method different from the one used to convey the message. The recipient enters the result and, if correct, the wrapper 825 allows access to the data 820. Once the data is closed the authentication session ends. Each time an attempt is made to open the message, another authentication begins with a new arrangement. Thus, the arrangement includes new values assigned to the variables and requires the originator 705 to again determine the results of applying the originator's user formula. Therefore, if the recipient 715 attempts to open the message again, or forwards the message to another, the previous result of the user formula is no longer operable to open the message and the originator 705 may be notified.

Figure 9:
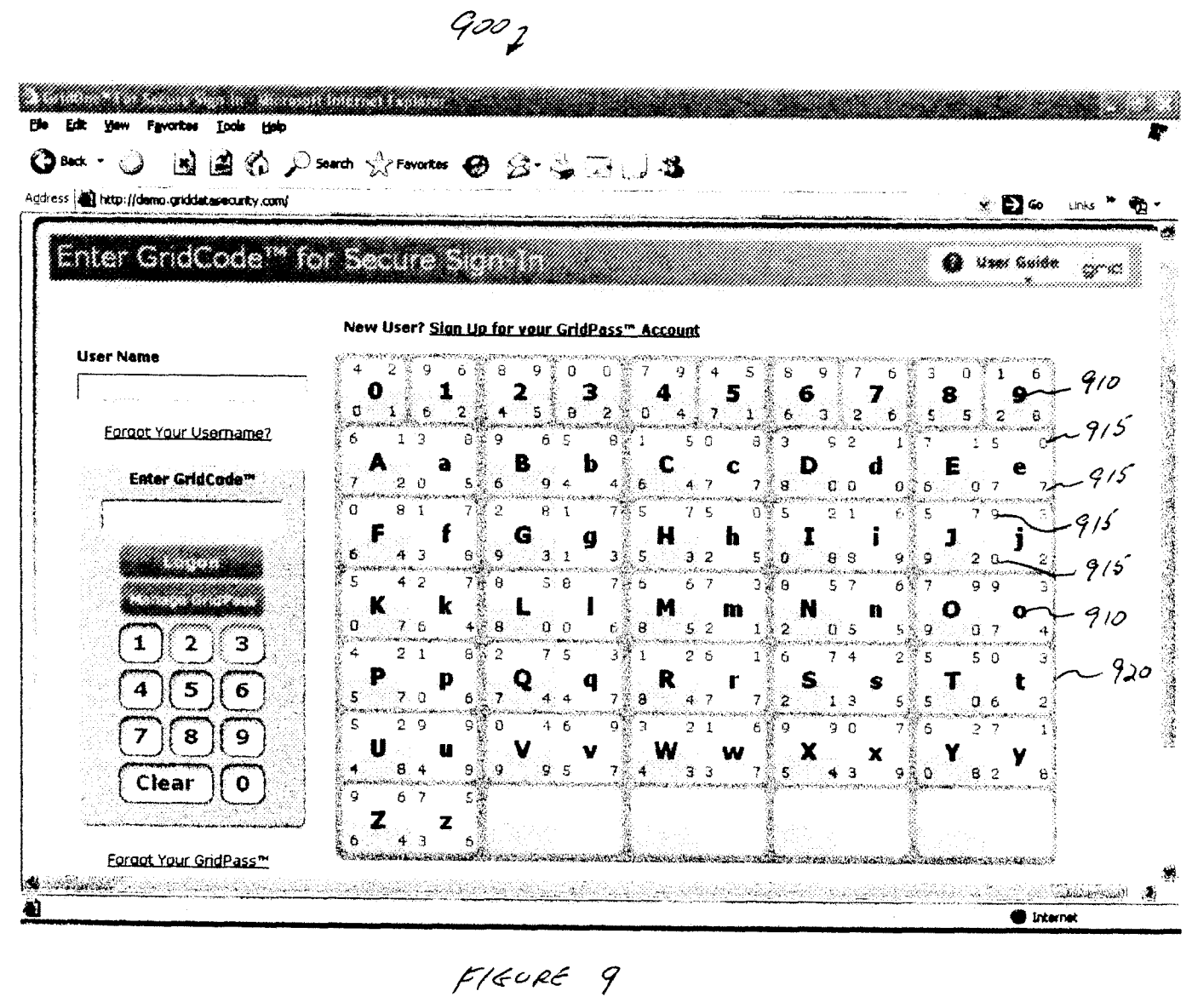

Another embodiment of the arrangement presented to a user is shown in FIG. 9. As mentioned above, as part of the authentication session, an arrangement of variables 900 may be presented to a user. The arrangement 900 may include variables 910 and multiple values 915 in each cell 920. As mentioned above, the variables and values may include any alphanumeric character, or any mark, symbol, or image.

In this embodiment, the cells 920 are each denoted by a variable 910 with a value 915 in each corner of each cell. It should be understood that there may be any number of variables 910 and values 915 in any location in each cell. For example, each cell may have a geometric shape such as a rectangle, and the values may be located in corners of each cell. As another example, each cell may have a circular shape and the location of values in each cell may be specified in degrees.

Generally, the value to be assigned to a variable as part of the authentication process may have a specific location in the cell called a target location. The cell in FIG. 9 with the variable H may be used as an example. If the target location for H is the upper left hand corner, the value to be assigned to H is 5.

In an exemplary embodiment, as part of the user set up process described previously, a user may provide information, referred to as a profile. The user profile may include information about the user, for example, a name, contact information, work location, etc. The profile may be stored in controller 215 (FIG. 5), local computing device 230 (FIG. 5) storage facility 265 (FIG. 5) or any other appropriate location. The user profile may also include one or more target locations for the variables in the user's user formula. The target locations may be specified in terms of relative location within each cell, such as, "upper left corner," or "90 degrees." Any other location specification technique may be used.

In another embodiment, the target locations may be specified as part of the user formula. For example, an exemplary user formula for the embodiment shown in FIG. 9 may be B(UL)+C(LL), where UL is a target that designates using a value in the upper left corner of the cell that includes B, and LL is a target location that designates using a value in the lower left corner of the cell that includes C. Any other designation may be used to specify a target location within a cell.

Upon initiation of an authentication session, the authentication system 100 presents a user with an arrangement of variables as shown in FIG. 9. Each cell may have a variable and a number of values. The user recognizes the variables presented in the arrangement that match the variables in the user formula. The user may also understand that each variable has a target location where the value to be assigned to the variable is located. The user recognizes each variable, assigns the value in the target location specified for that variable to the variable, performs the operations of the user formula and enters the result. The authentication system independently assigns the value in the target location specified for that variable to the variable and performs the operations of the user formula to generate an independent result. The authentication system compares the independent result with the user entered result and if the results match, the authentication system gives the user access to the service or application. If the results do not match, access is denied.

Figure 10:
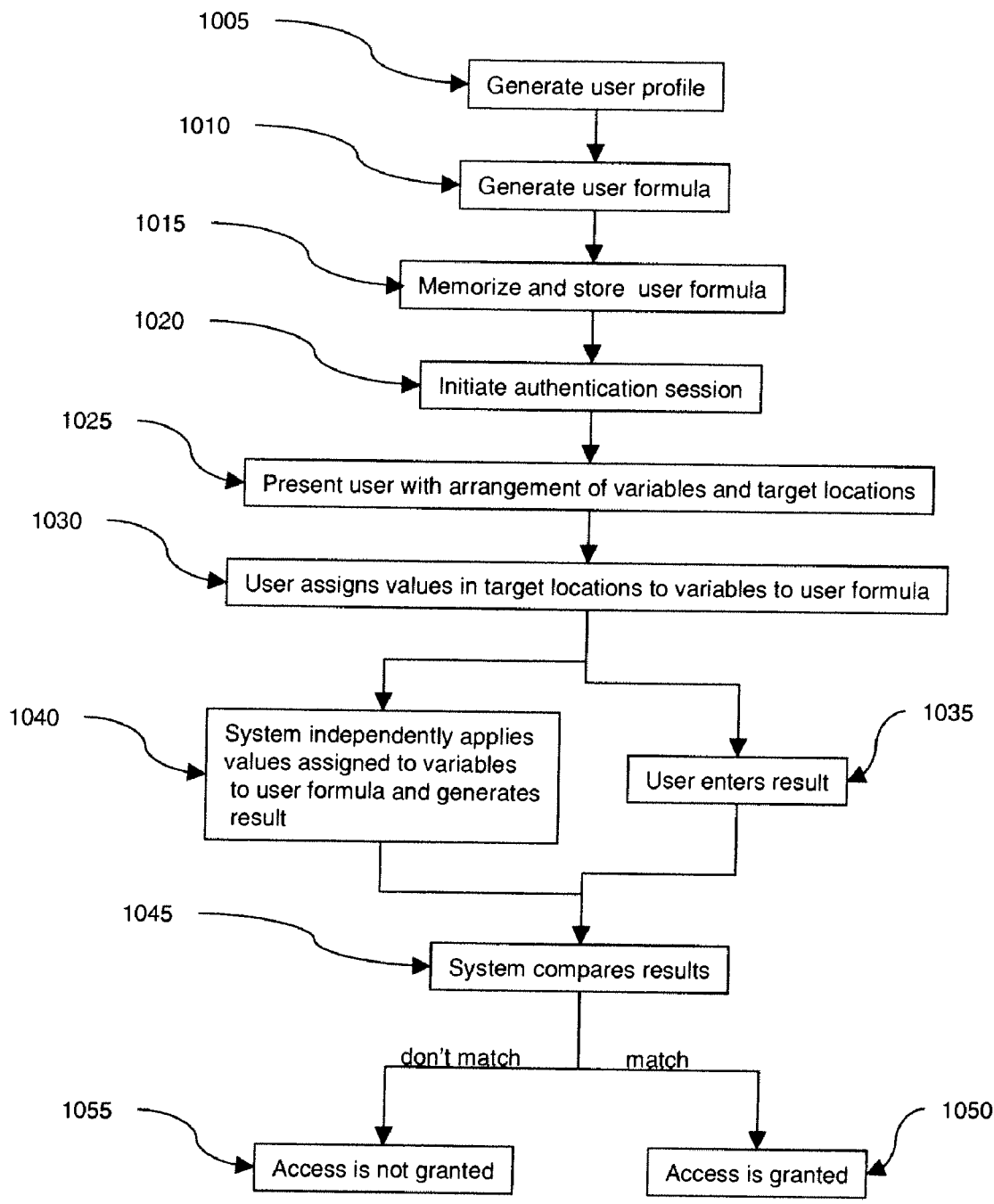
FIG. 10 shows a flow diagram illustrating an embodiment utilizing target locations.

FIG. 10 shows a flow diagram illustrating an embodiment utilizing target locations stored in the user profile. In block 1005 a user profile is generated as described above. A user formula is generated in block 1010 and memorized and stored in block 1015. As shown in block 1020 an authentication session is initiated. In block 1025 the authentication system 100 presents a user with an arrangement of variables and target locations. In block 1030 the user recognizes the variables presented in the arrangement that match the variables in the user formula and assigns the value in the target location specified for that variable to the variable. In block 1035 the user determines a result of the user formula and enters that result. In block 1040 the authentication system independently assigns the value in the target location specified for that variable to the variable and performs the operations of the user formula to generate an independent result. In block 1045 the authentication system compares the independent result with the user entered result and if the results match, the authentication system gives the user access to the service or application as shown in block 1050. If the results do not match, access is denied as shown in block 1055.

Figure 11:
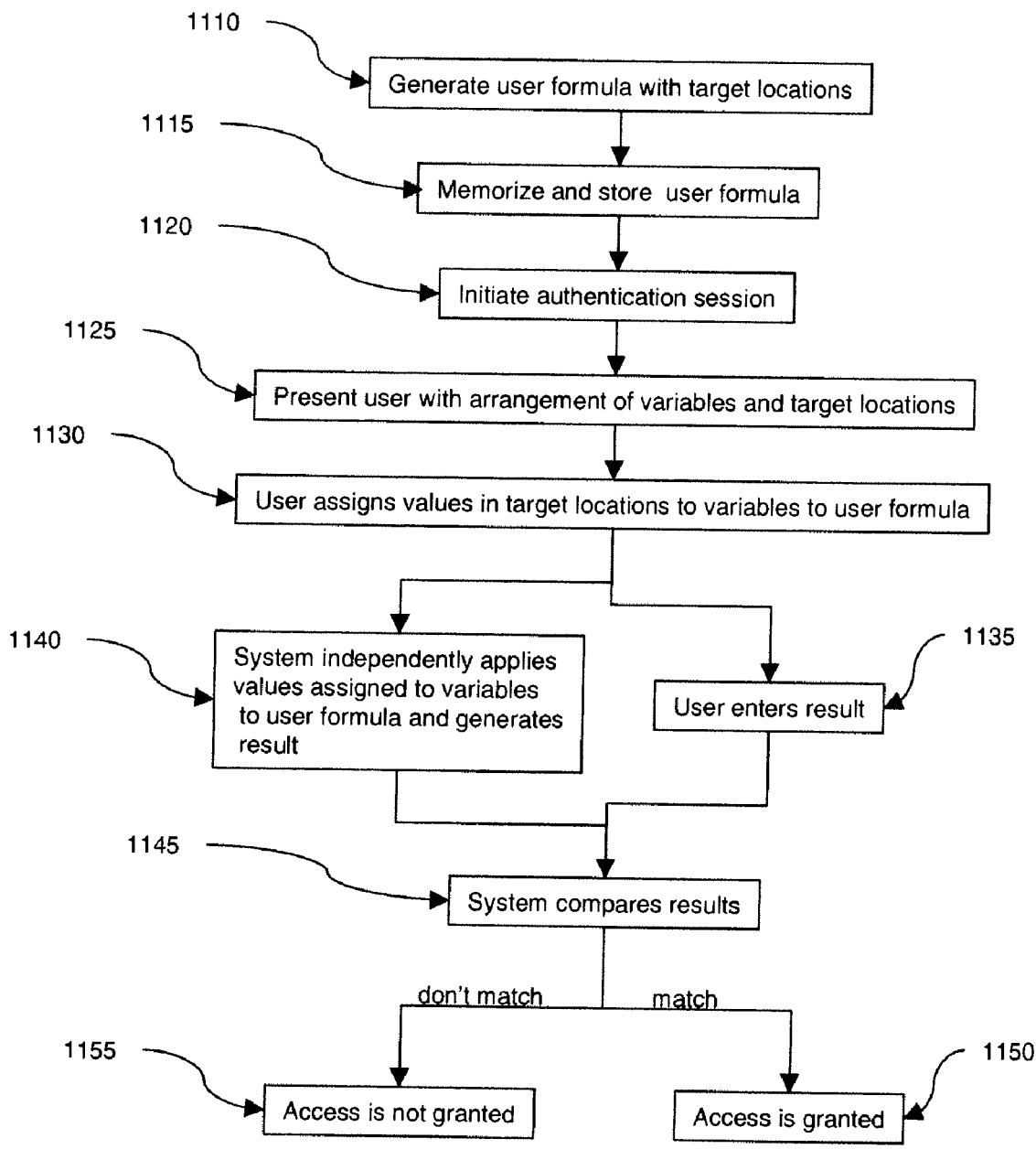
FIG. 11 shows a flow diagram illustrating another embodiment utilizing target locations.

FIG. 11 shows a flow diagram illustrating an embodiment utilizing target locations as part of the user formula. In block 1110 a user formula is generated with target locations. In block 1115 the user formula is memorized and stored. An authentication session is initiated as shown in block 1120. In block 1125 the authentication system 100 presents a user with an arrangement of variables and target locations. The user recognizes the variables presented in the arrangement that match the variables in the user formula and assigns the value in the target location specified for that variable to the variable as shown in block 1130. In block 1135 the user determines a result of the user formula and enters that result. In block 1140 the authentication system independently assigns the value in the target location specified for that variable to the variable and performs the operations of the user formula to generate an independent result. The authentication system compares the independent result with the user entered result as shown in block 1145. If the results match, in block 1150 the authentication system gives the user access to the service or application. As shown in block 1155, if the results do not match, access is denied.

Returning to FIG. 9, while the arrangement of cells is shown as a rectangular grid, the arrangement may have any shape and may include any number of cells or locations. The cells within the arrangement may also have any shape.

In another embodiment, the authentication system may allow a user to add dummy characters, also referred to generally as decoy characters or specifically for numbers, decoy digits, to the user formula result. This feature is advantageous because it allows a user to dynamically disguise the user formula result even further by spontaneously adding additional characters to the user formula result before entering it. The user may add decoy characters anywhere in the user formula result. Thus, in the event a user's actions and arrangement of variables are being observed or recorded, the actual user formula result is indiscernible from the decoy characters. The decoy characters may include any alphanumeric character, mark, symbol, or image.

In one embodiment any number of decoy characters may be interspersed among the characters of the user formula result. In another embodiment, there may be restrictions on the allowable decoy characters. For example, certain decoy characters or combinations of decoy characters may not be allowed. In other embodiments, a maximum number of allowable decoy characters may be specified. As a more specific example, the maximum number of decoy characters may be N/2 where N is the number of characters in the user formula result before adding decoy characters. The restrictions on decoy characters may be part of a user profile, or may be specified for all users, or a group of users. The decoy character restrictions may be stored in a memory, storage location, or storage area of the system 100.

Referring to the N/2 example, a user may be presented with an arrangement of variables and may calculate the user formula result as A6B4C3. The user provides AA6BB4C33 to the authentication system, thus adding an additional "A," an additional "B," and an additional "3" to the original result. In this example, the authentication system determines the characters in the original user formula result from the independent calculation described above and parses the AA6BB4C33 string. The authentication system determines that the original user formula result is present and determines that the number of decoy characters is three. The authentication system identifies that the number of decoy characters (3) satisfies the decoy character restriction, that is, the maximum number of N/2 decoy characters. The system then allows access. In the event that the number of decoy characters exceeds N/2 or the original user formula result is not present in the string, the authentication system denies access.

Other decoy character restrictions may be specified and other maximum numbers of decoy characters may be used, for example, N/3, N/4, etc.

Figure 12:
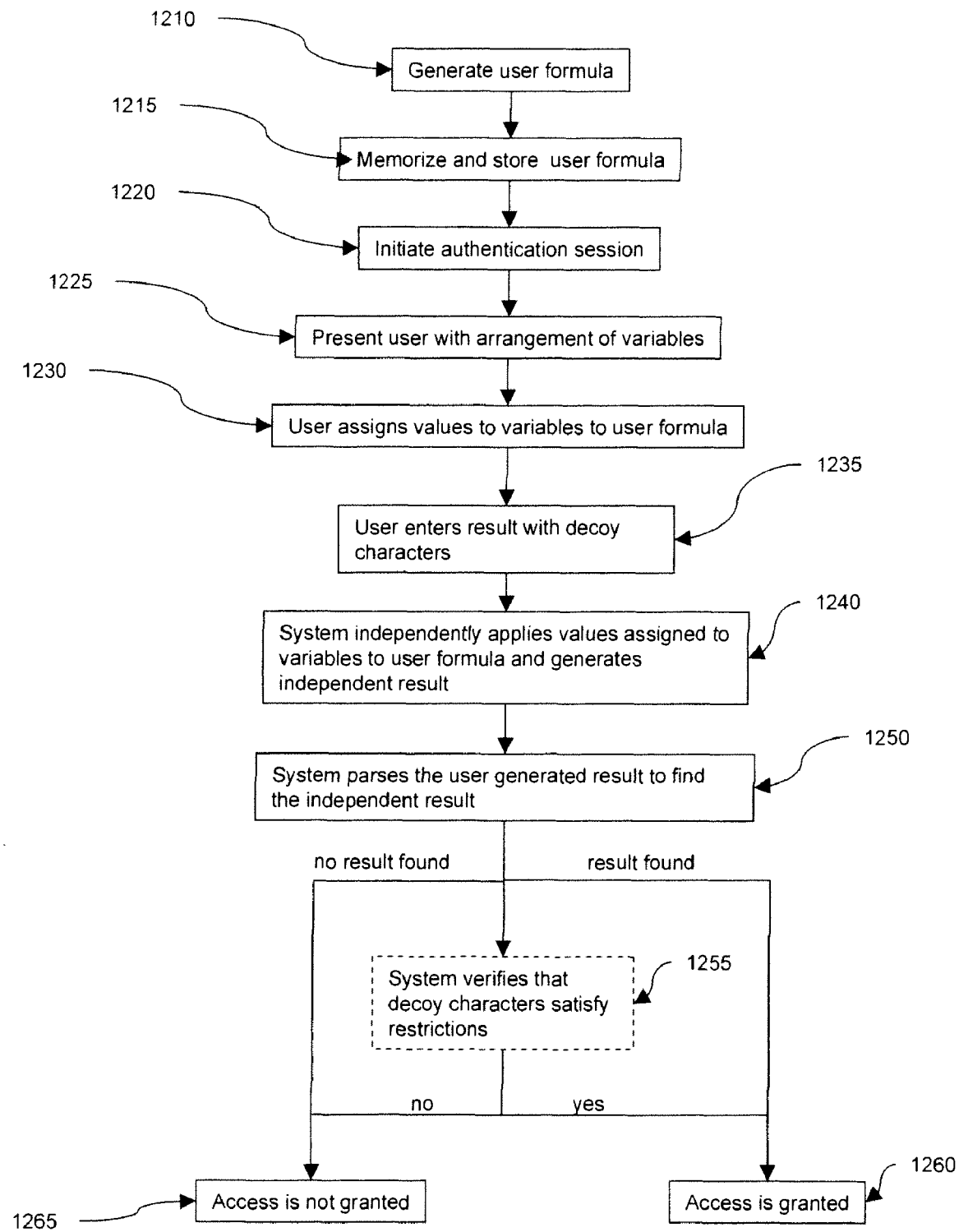
FIG. 12 shows a flow diagram illustrating an embodiment utilizing decoy characters.

FIG. 12 shows a flow diagram illustrating an embodiment utilizing decoy characters. A user formula is generated in block 1210. The user formula may or may not include target locations as described above. The user formula is memorized and stored in block 1215. An authentication session is initiated as shown in block 1220. The authentication system 100 presents a user with an arrangement of variables as shown in block 1225. The arrangement may or may not include target locations and values as described above. In block 1230 the user recognizes the variables presented in the arrangement that match the variables in the user formula and assigns the value specified for that variable to the variable. The value may be a value in a target location if required. As shown in block 1235 the user determines a result of the user formula and enters that result including one or more decoy characters. In block 1240 the authentication system independently performs the operations of the user formula using the values assigned to the variables to generate an independent result. The values may or may not have been assigned from target locations. In block 1250 the system parses the user generated result to find if the independent result is present among the interspersed decoy characters. If the result is not present access is denied as shown in block 1265. If the result is found and the set of decoy character restrictions on the decoy characters is null, access is granted as shown in block 1260. If the result is found and any decoy character restrictions have been specified, that is, the set of restrictions is not null, the system verifies that the decoy characters satisfy the restrictions as shown in block 1255. If the restrictions are not satisfied, access is not granted (block 1265). If the decoy character restrictions have been satisfied, access is granted (block 1260).

Referring again to FIG. 9, another embodiment of the authentication system allows allow a user to modify or customize the presentation of the arrangement of variables. The customization may be specific to a particular user or to a group of users. Upon initiation of an authentication session after user interface customization, the user is presented with their specific custom arrangement. This enables the user to verify that the system they are interacting with is in fact the authentication system and not an imposter system.

The user may be able to customize any number of features of the arrangement, including for example, the color scheme, toolbar colors, fill colors, background, text font, text size, text color, etc. In one embodiment, a user may be able to provide an image for inclusion as part of the arrangement, for example, as a background for the arrangement, as a background for a cell, as a variable, or as any portion of the arrangement.

The custom features of the arrangement may be stored as part of a user's profile, mentioned above. In one embodiment, upon initiation of an authentication session, a user may log in by typing their user name or some other unique identifier. The authentication system may then validate the user name and provides an arrangement of variables. If a legitimate user name has been provided, the authentication system may supply the customized arrangement associated with the user's profile, and may thus provide the user with, for example, a level of assurance that they are interacting with the authentication system. In another example, a user may be instructed to end the session if a legitimate user name has been provided and an arrangement is displayed without the user's customization.

In one embodiment, the authentication system may provide a generic arrangement if an invalid user name is provided so as to avoid alerting or providing any information to a potential imposter or attacker.

It should be understood that the foregoing description is only illustrative of the disclosed embodiments. Various alternatives and modifications can be devised by those skilled in the art without departing from the embodiments disclosed herein. Accordingly, the disclosed embodiments are intended to embrace all such alternatives, modifications and variances which fall within the scope of the appended claims.

What is claimed is:

1. A method of authenticating a user for access to a device, service, application, function, or system, comprising:
    using a processor of an authentication system for creating an authentication key in the form of a user formula selected from a set of variables and operations provided by the authentication system and for storing the user formula in the authentication system;
    utilizing a display to present the user with an arrangement of cells generated by the authentication system, each cell having a variable and one or more values assigned to the variable within the cell;
    using the processor to detect a first result calculated by identifying, for each variable in the user formula, a matching variable in one of the cells, applying one of the one or more values within the cell to the variable in the user formula, and performing the operations of the user formula;
    interspersing one or more dummy characters among the characters of the first result; and
    conveying the first result with the dummy characters to the authentication system,
    wherein the authentication system authenticates the user if a second result of a separate and independent calculation of the user formula calculated by the authentication system is found in the first result with the dummy characters and the dummy characters satisfy a set of specified restrictions.

2. The method of claim 1, wherein the set of specified restrictions is null.

3. The method of claim 1, wherein the authentication system processor operates to customize the arrangement of cells for the user.

4. The method of claim 1, wherein the variables comprise any alphanumeric character, mark, symbol, or image.

5. The method of claim 1, wherein the values comprise randomly generated numerical values.

6. The method of claim 1, comprising using the authentication system processor to provide the user with assistance in creating a user formula.

7. The method of claim 1, wherein the user formula includes one or more custom operators.

8. The method of claim 1, comprising using the authentication system processor for creating a local formula having a variable for receiving the first result and a remote formula having the user formula; and for authenticating the user if a calculation of the local formula matches a calculation of the remote formula.

9. The method of claim 8, wherein the local formula is transportable.

10. The method of claim 8, wherein the calculation of the local formula is performed by a local computing device, and calculation of the remote formula is performed by a controller remote from the local computing device.

11. The method of claim 1 further comprising:
    using the authentication processor for:
        providing a wrapper that initiates an authentication session according to claim 1;
        encapsulating a message with data in the wrapper;
        initiating a first authentication session for a message recipient and a second authentication session for a message originator upon an attempt to open the message;
        determining a user formula result from the second authentication session;
        providing the result to the first authentication session; and
        allowing the recipient to access the message and data upon authentication.

12. A system for authenticating a user for access to a device, service, application, function, or system, comprising:
    an authentication key in the form of a user formula selected from a set of variables and operations provided by the authentication system and stored in the authentication system;
    a display to present the user with an arrangement of cells generated by the authentication system, each cell having a variable and one or more values assigned to the variable within the cell;
    a first result calculated by identifying, for each variable in the user formula, a matching variable in one of the cells, applying one of the one or more values within the one cell to the variable in the user formula, performing the operations of the user formula, the first result interspersed with one or more dummy characters and conveyed to the authentication system; and
    circuitry in the authentication system for authenticating the user if a second result of a separate and independent calculation of the user formula calculated by the authentication system is found in the first result with the dummy characters and the dummy characters satisfy a set of specified restrictions.

13. A method of authenticating a user for access to a device, service, application, function, or system, comprising:

using a processor of an authentication system for creating an authentication key in the form of a user formula having variables and operations provided by the authentication system and for storing the user formula in the authentication system;

utilizing a display to present the user with an arrangement of cells, each cell including a variable and one or more target locations within the cell, each target location displaying a value; and using the processor to detect a first result calculated by identifying, for each variable in the user formula, a matching variable in one of the cells, applying the value at a specified target location in the one cell to the variable in the user formula, and performing the operations of the user formula;

wherein the authentication system processor authenticates the user if the first result matches a second result of a separate and independent calculation of the user formula calculated by the authentication system.

14. The method of claim 13, wherein the specified target location for each variable is included in the user formula.

15. The method of claim 13, wherein the specified target location for each variable is included in a user profile.

16. The method of claim 13, wherein the arrangement of cells generated by the authentication system is customized for the user.

17. The method of claim 13, wherein the variables comprise any alphanumeric character, mark, symbol, or image.

18. The method of claim 13, wherein the values comprise randomly generated numerical values.

19. The method of claim 13, comprising using the authentication system processor to provide the user with assistance in creating a user formula.

20. The method of claim 13, wherein the user formula includes one or more custom operators.

21. The method of claim 13, comprising: using the authentication system processor for creating a local formula having a variable for receiving the first result and a remote formula having the user formula; and authenticating the user if a calculation of the local formula matches a calculation of the remote formula.

22. The method of claim 21, wherein the local formula is transportable.

23. The method of claim 21, wherein the calculation of the local formula is performed by a local computing device, and calculation of the remote formula is performed by a controller remote from the local computing device.

24. The method of claim 13 further comprising:
using the authentication system processor for:
providing a wrapper that initiates an authentication session according to claim 13;
encapsulating a message with data in the wrapper;
initiating a first authentication session for a message recipient and a second authentication session for a message originator upon an attempt to open the message;
determining a user formula result from the second authentication session;
providing the result to the first authentication session; and
allowing the recipient to access the message and data upon authentication.

25. A system for authenticating a user for access to a device, service, application, function, or system, comprising:
an authentication key in the form of a user formula having variables and operations provided by the authentication system and stored in the authentication system;
a display for presenting the user with an arrangement of cells, each cell including a variable and one or more target locations within the cell, each target location displaying a value;
a first result calculated by identifying, for each variable in the user formula, a matching variable in one of the cells, applying the value at a specified target location in the one cell to the variable in the user formula, and performing the operations of the user formula; and
circuitry in the authentication system for authenticating the user if the first result matches a second result of a separate and independent calculation of the user formula calculated by the authentication system.

26. A method of authenticating a user for access to a device, service, application, function, or system, comprising:
using a processor of an authentication system for creating an authentication key in the form of a user formula having variables and operations provided by the authentication system and for storing the user formula in the authentication system;
utilizing a display to present the user with an arrangement of cells, each cell including a variable and one or more target locations within the cell, each target location displaying a value;
using the processor to detect a first result calculated by identifying, for each variable in the user formula, a matching variable in one of the cells, applying the value at a specified target location in the one cell to the variable in the user formula, and performing the operations of the use formula; and
using the processor to detect an interspersing of one or more dummy characters among the characters of the first result;
wherein the authentication system processor authenticates the user if a second result of a separate and independent calculation of the user formula calculated by the authentication system is found in the first result with the dummy characters and the dummy characters satisfy a set of specified restrictions.

27. The method of claim 26, wherein the set of specified restrictions is null.

28. The method of claim 26, wherein the specified target location for each variable is included in the user formula.

29. The method of claim 26, wherein the specified target location for each variable is included in a user profile.

30. The method of claim 26, wherein the authentication system processor customizes the arrangement of cells for the user.

31. The method of claim 26, wherein the variables comprise any alphanumeric character, mark, symbol, or image.

32. The method of claim 26, wherein the values comprise randomly generated numerical values.

33. The method of claim 26, comprising using the authentication system processor to provide the user with assistance in creating a user formula.

34. The method of claim 26, wherein the user formula includes one or more custom operators.

35. The method of claim 26, comprising:
using the authentication system processor for creating a local formula having a variable for receiving the first result and a remote formula having the user formula and for
authenticating the user if a calculation of the local formula matches a calculation of the remote formula.

36. The method of claim 35, wherein the local formula is transportable.

37. The method of claim 35, wherein the calculation of the local formula is performed by a local computing device, and calculation of the remote formula is performed by a controller remote from the local computing device.

38. The method of claim 26 further comprising:
using the authentication processor for;
provic a wrapper that initiates an authentication session according to claim 26;
encapsulating a message with data in the wrapper;
initiating a first authentication session for a message recipient and a second authentication session for a message originator upon an attempt to open the message;
determining a user formula result from the second authentication session;
providing the result to the first authentication session; and
allowing the recipient to access the message and data upon authentication.

39. A system for authenticating a user for access to a device, service, application, function, or system, comprising:

an authentication key in the form of a user formula having variables and operations provided by the authentication system and stored in the authentication system;
a display for presenting the user with an arrangement of cells, each cell including a variable and one or more target locations within the cell, each target location displaying a value;
a first result calculated by identifying, for each variable in the user formula, a matching variable in one of the cells, applying the value at a specified target location in the one cell to the variable in the user formula, performing the operations of the user formula, the first result interspersed with one or more dummy characters and conveyed to the authentication system; and
circuitry in the authentication system for authenticating the user if a second result of a separate and independent calculation of the user formula calculated by the authentication system is found in the first result with the dummy characters and the dummy characters satisfy a set of specified restrictions.

* * * * *

UNITED STATES PATENT AND TRADEMARK OFFICE
CERTIFICATE OF CORRECTION

PATENT NO. : 7,725,712 B2  Page 1 of 1
APPLICATION NO. : 11/552555
DATED : May 25, 2010
INVENTOR(S) : Ginzburg et al.

It is certified that error appears in the above-identified patent and that said Letters Patent is hereby corrected as shown below:

Column 18, line 30, delete "use" and insert --user-- therefor.

Signed and Sealed this

Twenty-first Day of December, 2010

David J. Kappos
*Director of the United States Patent and Trademark Office*

UNITED STATES PATENT AND TRADEMARK OFFICE
CERTIFICATE OF CORRECTION

PATENT NO. : 7,725,712 B2  
APPLICATION NO. : 11/552555  
DATED : May 25, 2010  
INVENTOR(S) : Ginzburg et al.

Page 1 of 1

It is certified that error appears in the above-identified patent and that said Letters Patent is hereby corrected as shown below:

Column 19, line 6, delete "for;" and insert --for:--, therefor.

Signed and Sealed this
Fourth Day of January, 2011

David J. Kappos
*Director of the United States Patent and Trademark Office*